US011678671B2

(12) United States Patent
Huang

(10) Patent No.: US 11,678,671 B2
(45) Date of Patent: Jun. 20, 2023

(54) STUFFED FOOD FORMING MACHINE

(71) Applicant: SHANGHAI SOONTRUE MACHINERY EQUIPMENT CO., LTD., Shanghai (CN)

(72) Inventor: Song Huang, Shanghai (CN)

(73) Assignee: Shanghai Soontrue Machinery Equipment Co., Ltd., Shanghai (CN)

( * ) Notice: Subject to any disclaimer, the term of this patent is extended or adjusted under 35 U.S.C. 154(b) by 880 days.

(21) Appl. No.: 16/616,207

(22) PCT Filed: Mar. 9, 2018

(86) PCT No.: PCT/CN2018/078535
§ 371 (c)(1),
(2) Date: Nov. 22, 2019

(87) PCT Pub. No.: WO2019/062032
PCT Pub. Date: Apr. 4, 2019

(65) Prior Publication Data
US 2020/0205421 A1 Jul. 2, 2020

(30) Foreign Application Priority Data
Sep. 30, 2017 (CN) .......................... 201710913622.7

(51) Int. Cl.
A21C 9/08 (2006.01)
A21C 9/06 (2006.01)
A21C 3/10 (2006.01)
(52) U.S. Cl.
CPC ............... *A21C 9/063* (2013.01); *A21C 3/10* (2013.01); *A21C 9/088* (2013.01)

(58) Field of Classification Search
None
See application file for complete search history.

(56) References Cited

U.S. PATENT DOCUMENTS 1,806,326 A * 5/1931 Belshaw .............. A21C 11/163
192/17 R
2019/0045801 A1* 2/2019 Bjerrum ................ A21C 11/10

FOREIGN PATENT DOCUMENTS

CN 204697808 * 10/2015
CN 205756904 * 12/2016

OTHER PUBLICATIONS

CN 204697808 machine translation (Year: 2015).*
CN 205756904 machine translation (Year: 2016).*

* cited by examiner

*Primary Examiner* — Timothy Kennedy
*Assistant Examiner* — Alexander A Wang

(57) ABSTRACT

A stuffed food forming machine disclosed includes a framework (600), a rotation assembly (100). A sending and cutting station (20) and a filling station (30) are settled around the rotation assembly. An opening (106) for collecting wrapper residues is set on the rotation assembly. A distance between an internal side of a shaping mold (1001) and a center of the rotation assembly (100) is bigger than a distance between the edge of the opening (106) and the center of the rotation assembly (100). The opening (106) is able to collect the wrapper residues while takes advantage of the space below the rotation assembly, which requires no extra space and the whole machine remains the compact size.

7 Claims, 18 Drawing Sheets

STUFFED FOOD FORMING MACHINE

CROSS REFERENCE OF RELATED APPLICATION

This is a U.S. National Stage under 35 U.S.C 371 of the International Application PCT/CN2018/078535, filed Mar. 9, 2018, which claims priority under 35 U.S.C. 119(a-d) to CN 201710913622.7, filed Sep. 30, 2017.

BACKGROUND OF THE PRESENT INVENTION

Field of Invention

The present invention relates to a food processing field, and more particularly to a stuffed food forming machine.

Description of Related Arts

The size of the machine for processing foods with stuffing is large, especially the size of the wrapper collection part of the machine. How to reduce the size of the machine for processing foods with stuffing is a challenge in the food processing field.

The Chinese patent application CN200820062031.X (filing date: Jan. 29, 2018) disclosed a dumpling making machine which comprises a flake feeding unit, a stuffing injection unit, a dumpling forming unit, a discharge tailstock and a driving unit. The dumpling forming unit comprises a horizontal work station rotation disc, a forming mold, a flake feeding apparatus, a flake receiving station and a stuffing receiving station on the surface of the rotation disc corresponds to the stuffing injection unit and are arranged on the rotation disc; a jacking unit is arranged at the folding station, one side of a dumpling pushing station is provided with a push unit, and the other side is provided with the discharge tailstock; a mold completes laying closing molds, opening molds, spreading, etc. under the control of the guiding rail.

Furthermore, a Chinese patent application CN201610274834.0 (filling date: Apr. 28, 2016) disclosed a compact stuffed food shaping machine. The invention belongs to the technical field of food processing and in particular relates to a compact stuffed food shaping machine. The shaping machine comprises a rack and a work station rotation disc arranged on the rack, wherein a wrapper making device, a stuffing device, a laminating device and a discharge device are respectively arranged around the work station rotation disc; a wrapper making work station is arranged on the wrapper making device; a stuffing work station is arranged on the stuffing device; a laminating work station is arranged on the laminating device; a discharge work station is arranged on the discharge device; a split shaping mold is also arranged on the rack and comprises a rotary wrapper receiving plate and molding cups.

Neither of the above conventional inventions is able to provide a convenient solution to process dough sheet and collect the wrapper residues left after the dough sheet being cut into wrappers within limited space. The size of the conventional inventions is not able to be further reduced. The wrapper residues collection device is complicated and requires multiple control points, which induce high fault rate and high maintenance cost.

SUMMARY OF THE PRESENT INVENTION

An object of the present invention is to provide a stuffed food forming machine which is able to process the dough sheet and collect the wrapper residues effectively and deal with the problem of the size of the conventional machine is not able to be further reduced.

A technical solution of the present invention is as follow:

Stuffed food forming machine comprises a framework and a rotation assembly on the framework; wherein at least a sending and cutting work station and a filling work station are around the rotation assembly; the rotation assembly has an opening for collecting wrapper residues from the sending and cutting work station; a distance between an internal side of one of shaping molds which rotates with the rotation assembly and a center of the rotation assembly is bigger than a distance between an edge of the opening and the center of the rotation assembly;

wherein the foods processed in the present invention include all kinds of stuffed foods such as dumplings, Tangyuan, Baozi, Shumai, Custard bun, Wonton, etc. Take the process of making dumpling as an example, the dough sheet before cutting is dumpling dough sheet, the dumpling dough sheet is cut into wrappers which are different according to different cutters and the residues left is wrapper residues. The distance between an internal side of one of shaping molds and a center of the rotation assembly is bigger than a distance between an edge of the opening and the center of the rotation assembly, which enables the wrapper residues to conveniently drop in the opening.

A sending and cutting part is set on the sending and cutting work station. A filling part is set on a filling work station. The sending and cutting part and the filling part adopt the conventional structure. The sending and cutting station and filling station are set around the rotation assembly while other processing stations are set inside the rotation disc or on positions other than the rotation assembly.

A pressing and shaping work station and a dumpling taking-out work station may set beside the filling station around the rotation assembly. A pressing and shaping part is on the pressing and shaping work station. A taking-out part is on the dumpling taking-out work station. The pressing and shaping part and the taking-out part adopts conventional structure.

The working principle:

step 1: sending and cutting the dough sheet; wherein the shaping mold on the rotation disc is under the sending and cutting station; the dough sheet is cut into pre-set shape before dropping in the shaping mold; the wrapper residues are collected by the opening on the rotation disc and transported downward, thus the wrapper residues are collected.

step 2: filling the wrapper with stuffing; wherein the shaping mold transports the wrapper to the filling work station; the stuffing is injected in the wrapper; furthermore step 3: pressing and shaping; wherein the shaping mold is transported to the pressing and shaping work station by the rotation disc; the wrapper is pressed and shaped; and step 4: taking out the food; wherein the shaping mold is transported to the taking-out work station; taking out the dumpling.

The structure of the rotation assembly is as below.

The rotation assembly comprises the rotation disc. Multiple shaping molds are evenly distributed on the rotation disc. The opening for collecting the wrapper residues is on the rotation disc. The distance between an internal side of one of shaping molds and a center of the rotation disc is bigger than the distance between an edge of the opening and the center of the rotation disc. The opening is a through hole on the rotation disc. The wrapper residues are easily collected and drop in the opening due to the distance between an internal side of one of the shaping molds and a center of the rotation disc is bigger than the distance between an edge of the opening and the center of the rotation disc.

The opening is uninterrupted which means there is no break along the opening. The opening is a smooth circle which guarantees a continuous collection of the wrapper residues while the rotation disc is rotating. The opening is uninterrupted, which is a must for the collection of the wrapper residues.

The opening is a circle which may be set on the center of the rotation disc.

The opening is also able to be a ring which may be set on the center or center-outward position of the rotation disc.

The opening runs through an upper and lower surface of the rotation disc.

The relative position of the shaping mold and the opening is fixed;

wherein the top surface of the shaping molds lies above the opening; the shaping molds are set on an outer ring of the opening.

The top surface of the shaping molds lies above the opening. The shades of the shaping molds in a vertical direction fall partly or wholly in the opening.

The shape of the rotation disc is limited to a rectangle, a circle or an irregular shape.

A rotation sleeve is under and connects to the rotation disc; the rotation sleeve connects to a worm wheel; the worm wheel connects to a worm screw; the worm screw connects to a motor.

The structure of the rails is as below.

A base is set under the rotation disc; a guiding plate between the base and the rotation disc is a cylinder on an outer surface of which a first guiding rail runs; wherein the first guiding rail matches a first roller on a catch plate of the shaping mold to move the catch plate up and down.

The guiding plate is an uninterrupted cylinder.

Breaks are set on the guiding plate. The breaks are partly disconnected or disconnected. The guiding plate is set on the work position when the shaping molds need to be move up and down. The guiding plate is no longer needed when there is no need to adjust the height of a certain processing station.

The breaks are not less than one.

A second guiding rail is set along an outer ring of the base. The second guiding rail matches the second roller on the molding cup of the shaping mold to move the molding cup up and down.

The working principle of the rotation assembly is as below.

The motor drives the rotation disc to rotate and the shaping molds rotate with the rotation disc. The wrapper residues left after the dough sheet being cut are collected by the opening. The base and the guiding plate under the rotation disc are independent from rotation disc and don't rotate with the rotation disc. The guiding rails are set on the base and the guiding plate. The guiding rail match the guiding rollers on the shaping molds and brings the catch plate and the shaping mold to move up and down separately.

The working principles of the guiding rails are as below.

Specifically, the shaping molds adopt conventional structure. The shaping mold comprises a catch plate and a molding cup settled in the catch plate. The connecting rod under the catch plate connects to the first roller. The connecting rod under the molding cup connects to the second roller. The shaping mold rotates with the rotating disc while the guiding plate and the base remain still. The first roller moves along the first guiding rail, which drives the catch plate to move up and down on the outer surface of the guiding plate. The second rail acts with the second roller, which drives the molding cup up and down. The shaping mold is able to moves up and down to different work stations and different parts of the machine due to the settlement of the guiding rails.

The structure of the sending and cutting part is as below.

The sending and cutting part comprises a guiding pillar and a cylinder sleeve put on the guiding pillar. The cylinder sleeve connects to a cutter holding plate under which a cutter is settled. The cutter holding plate connects to an eccentric wheel by a connecting rod. The motor drives the eccentric wheel. A cutting plate is placed under the cutter, on which cutter-holes are set on the cutting plate. The cutter-holes match and act with the cutter to cut the dough sheet.

Two dough sheet supporters are placed across the supporting pillars. Two dough sheet sending roller conveyors are placed on the two dough sheet supporters. Multiple minor roller conveyors are settled between the two dough sheet sending roller conveyors. The cutting plate is placed between the multiple minor roller conveyors. The present invention does not require conveyor belt while the conventional machine still needs one.

Two supporting pillars are on two sides of the dough sheet supporters. A guiding pillar is on a top of each of the two supporting pillars.

Two grooves for placing a dough sheet roller conveyor are on one end of the two dough sheet supporters. The dough sheet is wound to rolls by the dough sheet roller conveyor which is placed in the two grooves.

A driven roller conveyor is placed above the dough sheet sending roller conveyor.

The dough sheet sending roller conveyor is driven by a motor.

The two dough sheet sending roller conveyors are connected by a belt and rolling synchronized.

The working principle of the sending and cutting dough sheet is as below.

The dough sheet is driven by the dough sheet sending roller conveyors and moves toward the cutter. The motor drives the eccentric wheel to rotate when the dough sheet is below the cutter. The connecting rod rotates with the eccentric wheel. The cutter holding plate is connected to the cylinder sleeve and the connecting rod, which moves up and down along the guiding pillar under the force of the connecting rod and the cylinder sleeve. The cutter moves up and down with the cutter holding plate and acts with the cutter-holes to cut the dough sheet.

The structure of the filling part is as below.

The filling part comprises a hopper and a rotating base which are set on the supporting frame. A rotating valve is inside the rotating base. The hopper is connected a top of the rotating base through filling pipe. An outlet pipe is connected to the bottom of the rotating base. A transverse injecting tube is besides the rotating base. A transverse injecting rod is inside the transverse injecting tube. A longitude injecting tube is on the mouth of the outlet pipe. The longitude injecting tube is driven by the gear rack driving mechanism to move up and down. The transverse injecting rod reciprocates horizontally under the force of the eccentric wheel driving mechanism. The screw conveyor inside the hopper rotates under the force of worm driving mechanism. The rotating valve is driven by a motor.

A longitude injecting rod is in the longitude injecting tube. The longitude injecting rod moves up and down inside the longitude injecting tube. The longitude injecting rod is driven by the gear rack driving mechanism. The longitude injecting rod pushes the stuffing down from the mouth of the outlet pipe.

The gear rack driving mechanism, eccentric wheel driving mechanism and the worm driving mechanism are driven by different motors separately, which is, each driving mechanism is driven by a different motor.

The gear rack driving mechanism is inside the supporting frame.

An L-shaped tunnel is inside the rotating valve.

The working principle of the filling part is as below.

The motor drives the worm screw and worm wheel to rotate. The worm screw and worm wheel drive the screw conveyor inside the hopper to stir the stuffing. The stirred stuffing is conveyed to the rotating valve. The motor drives the rotating valve to rotate by 90 degrees counter-clockwise after the rotating valve is filled with the stuffing. The motor drives the eccentric wheel driving mechanism. The eccentric wheel driving mechanism drives the transverse injecting rod to push the stuffing to the mouth of the outlet pipe from below the rotating valve. The motor drives the gear rack driving mechanism. The longitude injecting rod driven by the gear rack driving mechanism moves up and down to push down the stuffing from the mouth of the outlet pipe. The longitude injecting tube driven by the gear rack driving mechanism moves down to push the stuffing into the wrapper.

The structure of the pressing and shaping part is as below.

The pressing and shaping part comprises a supporting pillar and a pair of pressing molds fixed on the supporting pillar. Gears are on top of each of the pressing molds and pressing blocks are on bottom of the pressing molds. The gear on one of the pressing mold engages with the gear on the other pressing mold. The two pressing blocks are opposite to each other. A motor is connected to at least one of the pressing molds on the top.

The outline of the contact surface of the two pressing block is a curve.

One of the pressing blocks is convex and the other pressing block is concave.

The gears are set on the two semicircle rotating plates which are opposite to each other.

The working principle of the pressing and shaping part is as below.

The motor drives one of the pressing molds to rotate on the top. The gear on the top of the pressing mold drives the other pressing block to rotate through the engaged teeth. The two pressing block on the bottom press each other and seal the wrapper in a curved shape.

A method of shaping the stuffed food comprises following steps.

step 1: starting the sending motor; driving and conveying the dough sheet;

starting the stirring motor; stirring the stuffing continuously;

step 2: sending the dough sheet with a wrapper's length by the dough sheet sending motor; starting the sucking-and-pushing motor; sucking the material;

step 3: starting the cutting motor; cutting the dough sheet and driving the rotating valve to rotate 90 degrees counter-clockwise by the rotating valve motor;

step 4: starting the suck-and-pushing motor; pushing the stuffing; driving the rotation valve to rotate by 90 degrees counter-clockwise by the rotation valve motor;

step 5: restoring the rotating valve to the original position; starting the outer cylinder motor and the inner cylinder motor; driving the outer cylinder and inner cylinder respectively to push the stuffing into the wrapper;

step 6: restoring the outer cylinder motor and the inner cylinder motor to the original position after the stuffing is pushed into the wrapper;

step 7: driving the rotation disc to rotate 90 degrees by the rotation disc motor;

step 8: starting the pressing motor; pressing the wrapper with the stuffing inside and releasing a shaped dumpling;

step 9: driving the rotation disc to rotate 90 degrees by the rotation disc motor;

step 10: starting the taking-out motor and sending a clamper to the dumpling;

starting the clamping motor and clamping the dumpling;

step 11: restoring the taking-out motor; releasing the clamper and dropping the shaped dumpling;

step 12: driving the rotation disc to rotate 90 degrees and completing a processing circle; and step 13: going to the step 1.

The sending motor drives the dough sheet sending roller conveyor of the sending and cutting part to rotate.

The stirring motor drives the screw conveyor inside the hopper in the filling part to rotate.

The sucking-and-pushing motor drives the transverse injecting rod in the filling part to move horizontally.

The cutting motor drives the cutter in the sending and cutting part to move up and down and cut the dough sheet.

The rotation valve motor drives the rotation valve in the filling part to rotates.

The rotation disc motor drives the rotation disc in the rotation assembly to rotate.

The outer cylinder motor drives the longitude injecting tube in the filling part to move up and down.

The inner cylinder motor drives the longitude injecting rod in the filling part to move up and down.

The pressing motor drives the pressing mold of the pressing and shaping part to press and release.

The taking-out motor drives the clamper of the taking-out part to move.

The clamper motor drives the clamper in the taking-out part to clamp and release the dumplings.

The above mentioned motors are servo motor.

The benefits of the present invention are as follow.

1. The opening on the rotation assembly collects the wrapper residues and takes full advantage of the space under the rotation assembly. A recycling bin is placed under the opening to collect the wrapper residues, or a processing mechanism is settled under the opening to process the wrapper residues for reuse. The recycling bin or the processing mechanism does not increase the size of the machine and requires no extra space. The size of present invention is compact and is able to be further reduced, which meets the needs of a family, canteen or small shop.

2. The present invention replaces the conventional complicated driving mechanism driven by a single motor with separate motors for different parts. The improvement simplifies the driving mechanism and further reduces the space occupied by the conventional driving mechanism. The size of the present invention is further reduced. The size of the wrapper residues collecting mechanism is able to be enlarged accordingly for better performances.

3. The opening is able to be in any shape for the convenience of the wrapper residues collection. The distance between an internal side of one of the shaping molds and a center of the rotation assembly is bigger than the distance between an edge of the opening and the center of the rotation disc. The shaping molds are distributed on the outside of the opening or the shades of the shaping molds fall partly or wholly into the opening. The wrapper residues are able to conveniently fall into the opening without guiding.

4. The present invention adopts worm screw and worm wheel structure to drive the rotation sleeve and the rotation disc. The separate driving structure replaces the complicated cam mechanism and solves the problem of redundant driving structures required by a single motor. More space is able to be used for collection and processing of the wrapper residues.

5. The guiding plate acts with the base to move the catch plate and molding cup up and down between different positions. Breaks are on the first guiding rail and the second guiding rail. The guiding rails are applied when the corresponding work stations are adjusted. The guiding rails with breaks are simple in structure and reduce cost in material.

6. Compared to conventional machine, the sending and cutting part of the present invention removes the inner-pushing device inside the cutter, the conveyor belt and the scraper. The eccentric wheel structure drives the cutter to cut the dough sheet. The structure is simplified and the moves are steady. The space needed is further reduced 7. The dough sheet sending roller conveyor acts with minor roller conveyors to send the dough sheet. The dough sheet moves forward without a conveyor belt. The driven roller conveyor above the dough sheet sending roller conveyor brings more frictions to guarantee a smooth move of the dough sheet and avoid the sliding.

8. Each part of the present invention is driven by a different driving mechanism and a motor. The present invention removes complicated linkage structure, simplifies the whole structure and reduces the size of the machine. The gear rack driving mechanism, the eccentric wheel driving mechanism and the worm screw and worm wheel guarantee a stable transmission and action.

9. The pressing molds adopt gears on the top to pressing the wrapper from above. The present invention improves the conventional structures and prevents a squeeze on other part of the dumpling besides the edge of the wrapper due to the conventional horizontal pressing or pressing from below. The outlook of the dumpling is improved. The motor drives the pressing mold to rotate directly, which simplifies the structure and reduces the failure rate.

10. The present invention requires less control points and low maintenance cost.

Figure 1:
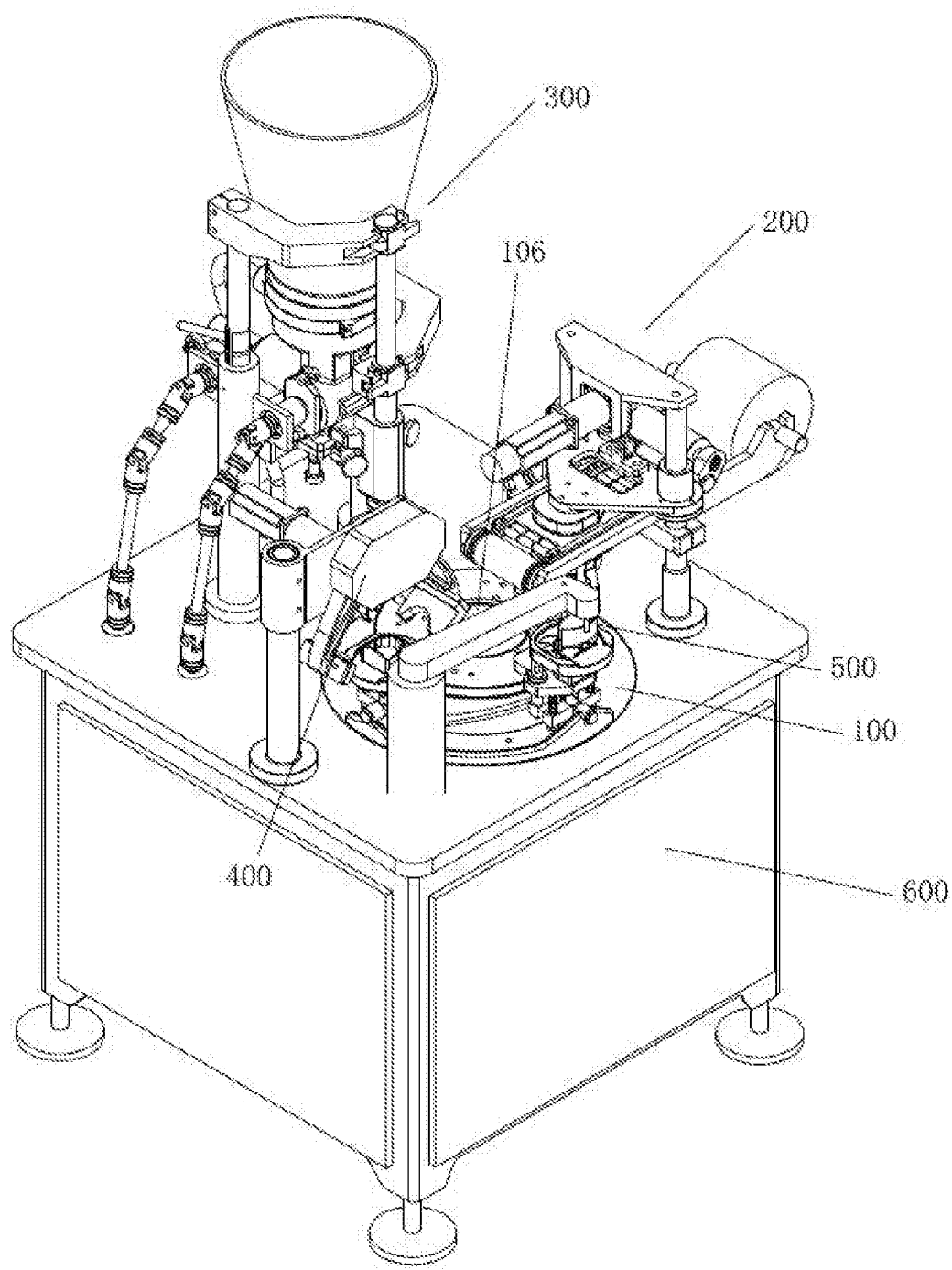
FIG. 1 is a perspective view of a whole stuffed food forming machine.
Figure 2:
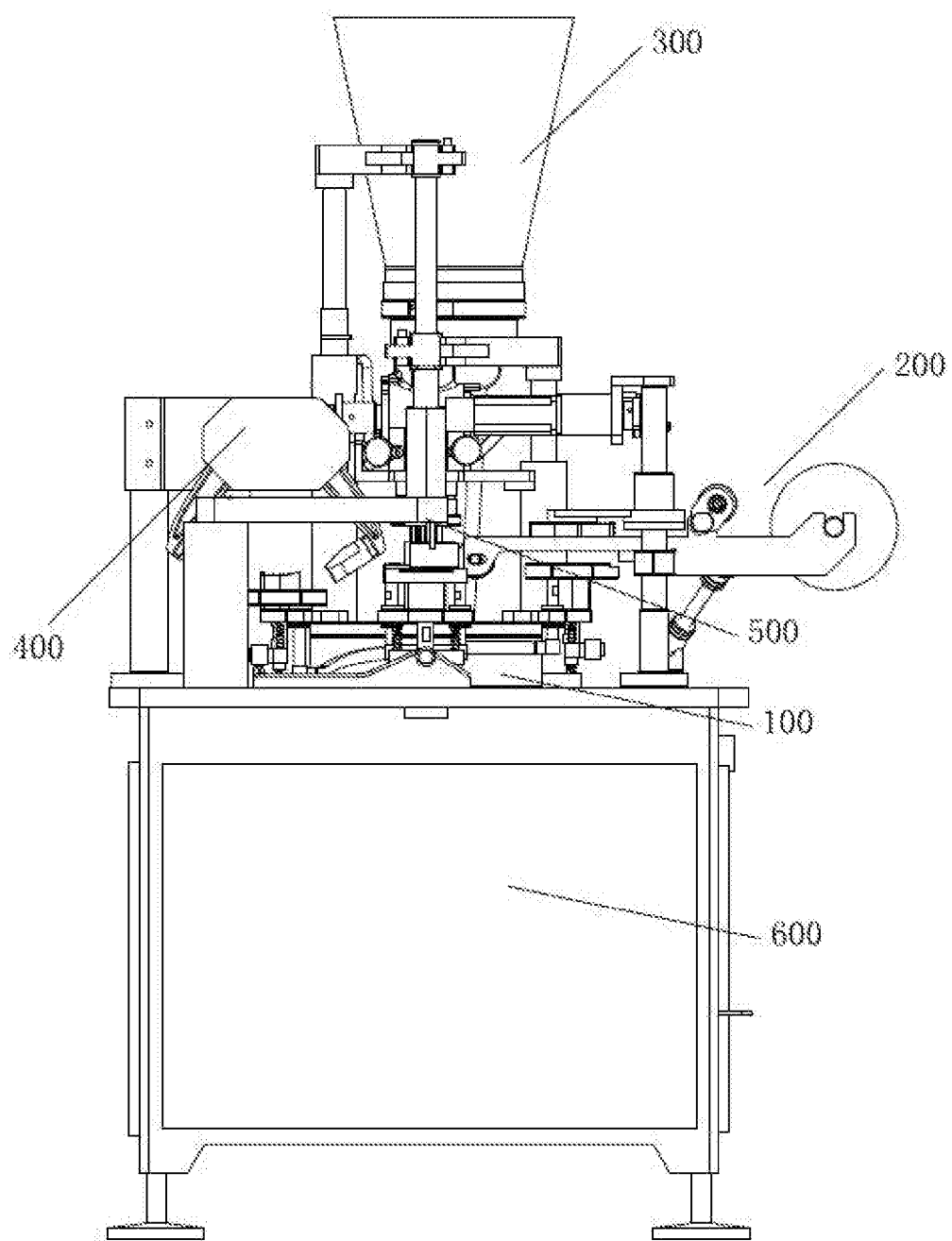
FIG. 2 is a side view of the whole stuffed food forming machine.
Figure 3:
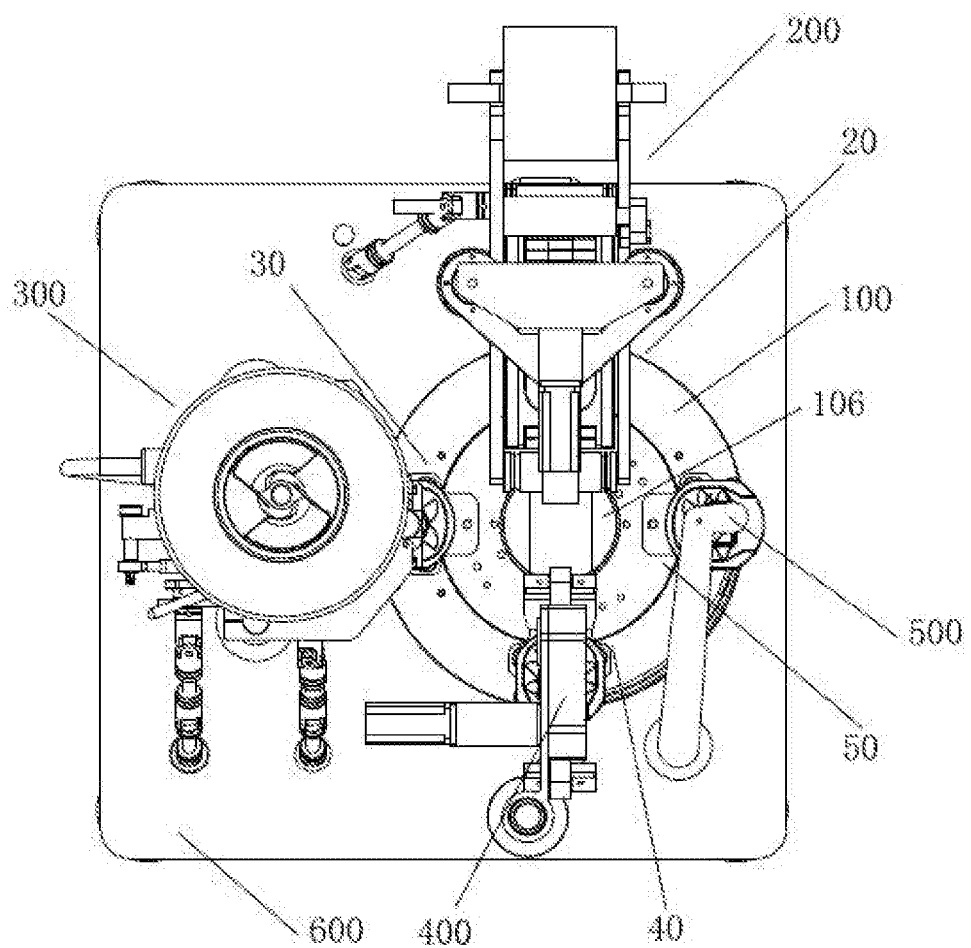
FIG. 3 is a top view of the whole stuffed food forming machine.
Figure 4:
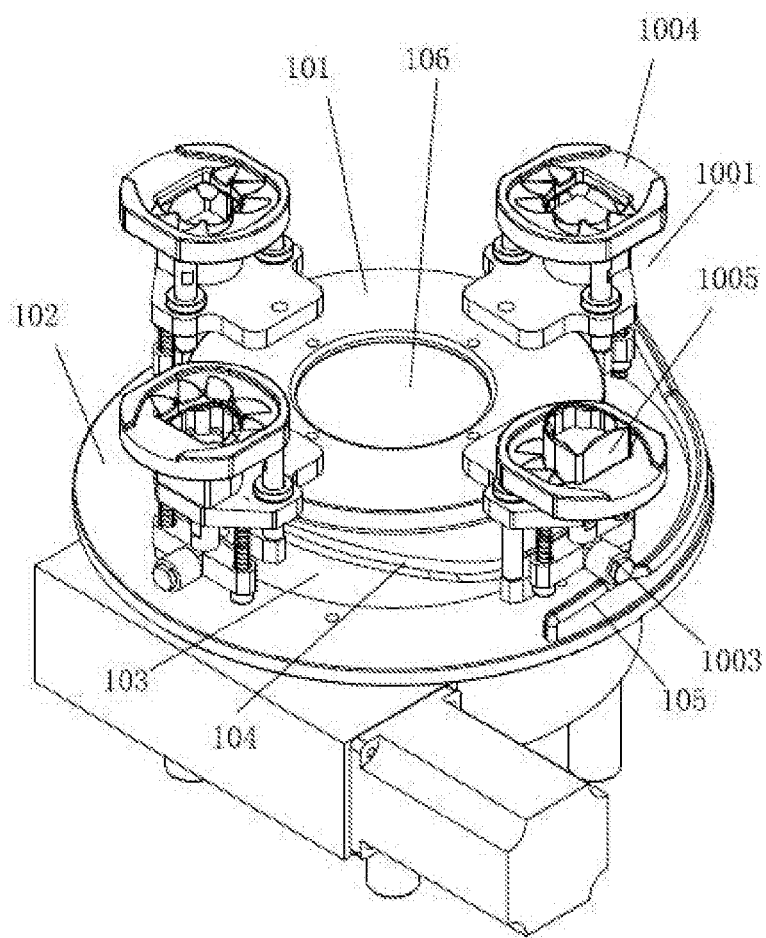
FIG. 4 is a perspective view of a rotation assembly.
Figure 5:
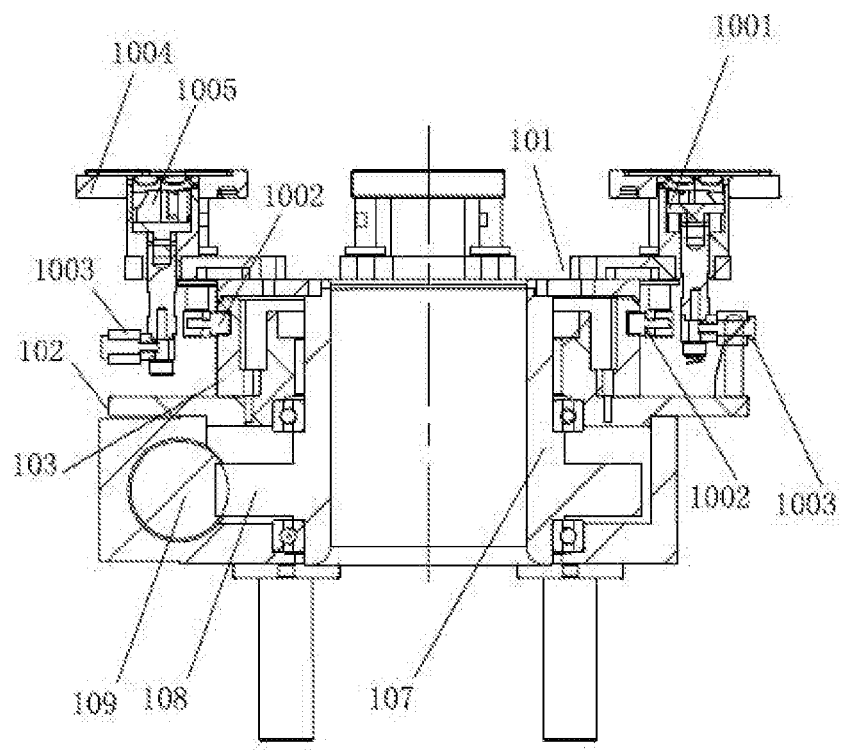
FIG. 5 is a sectional view of the rotation assembly.
Figure 6:
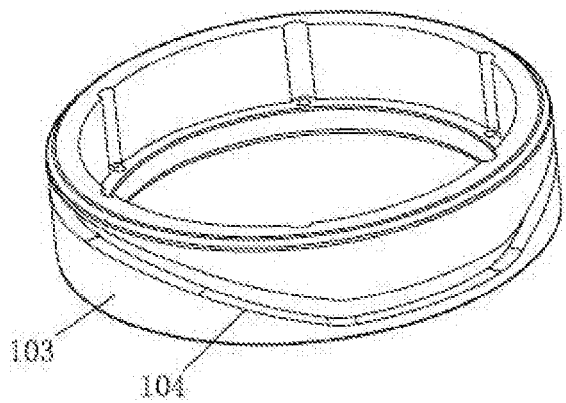
FIG. 6 is a perspective view of a guiding plate and a first guiding rail.
Figure 7:
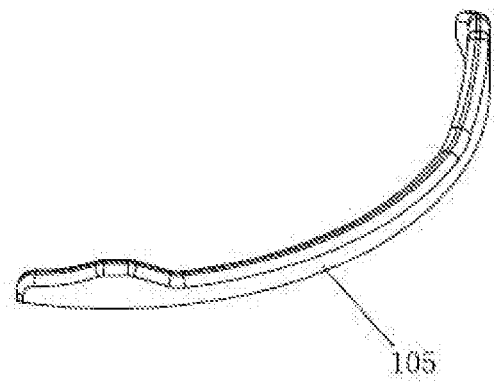
FIG. 7 is a perspective view of a second guiding rail on a base.
Figure 8:
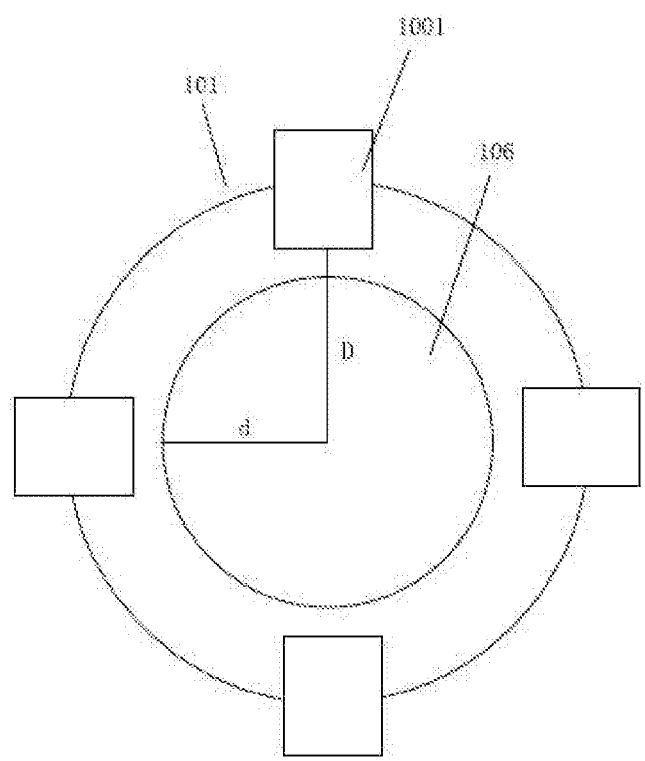
FIG. 8 is a perspective view of a distance D between internal side of one of shaping molds and a center of the rotation assembly is bigger than a distance d between an edge of the opening and the center of the rotation assembly.
Figure 9:
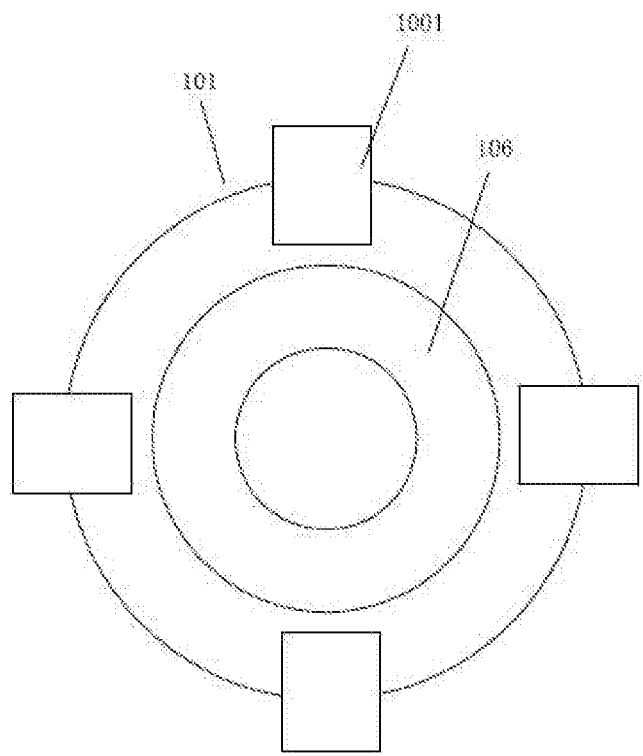
FIG. 9 is a perspective view of a ring-shaped opening.
Figure 10:
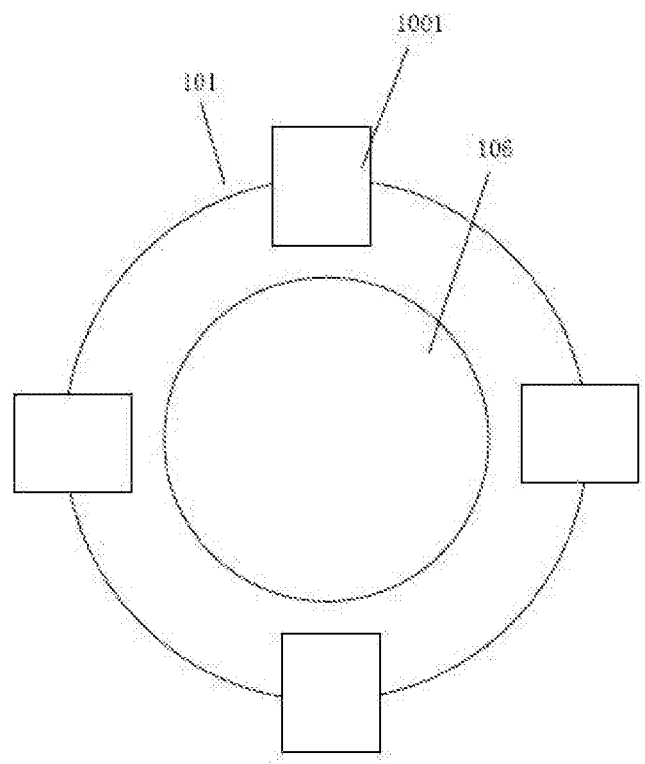
FIG. 10 is a perspective view of a distribution of the shaping molds on the outside of the opening.
Figure 11:
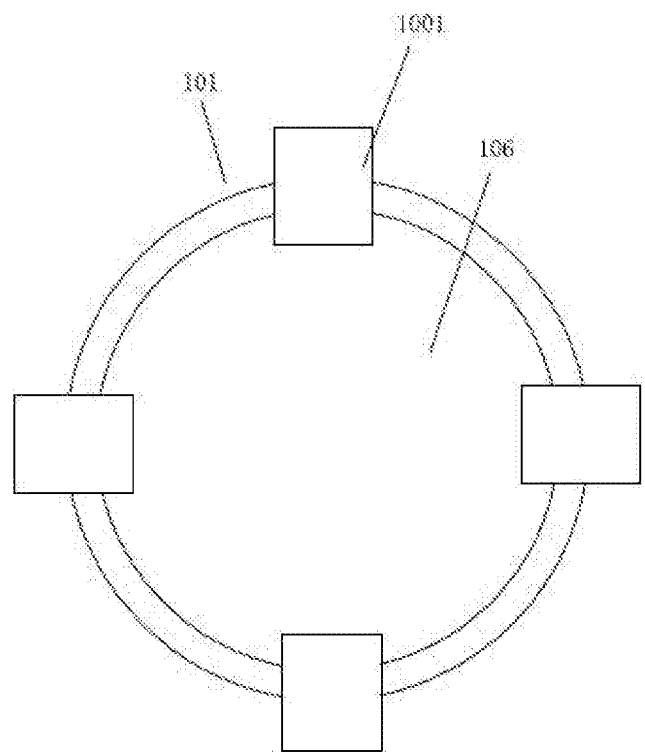
FIG. 11 is a perspective view of shades of the shaping molds fall partly or wholly into the opening.
Figure 12:
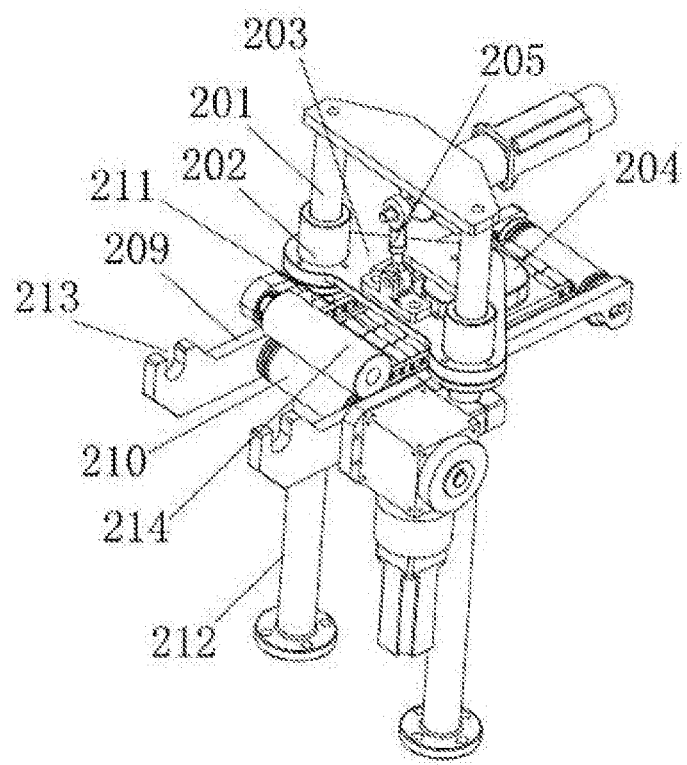
FIG. 12 is a perspective view of a sending and cutting part.
Figure 13:
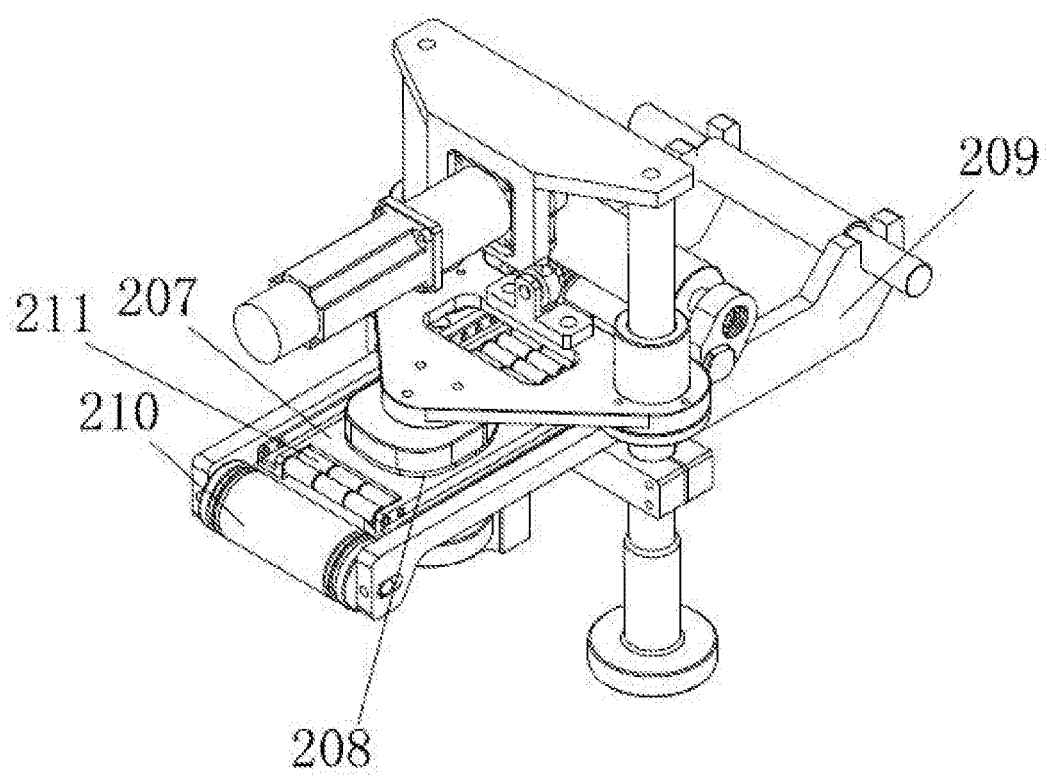
FIG. 13 is a perspective view of the sending and cutting part with a dough sheet sending roller conveyor.
Figure 14:
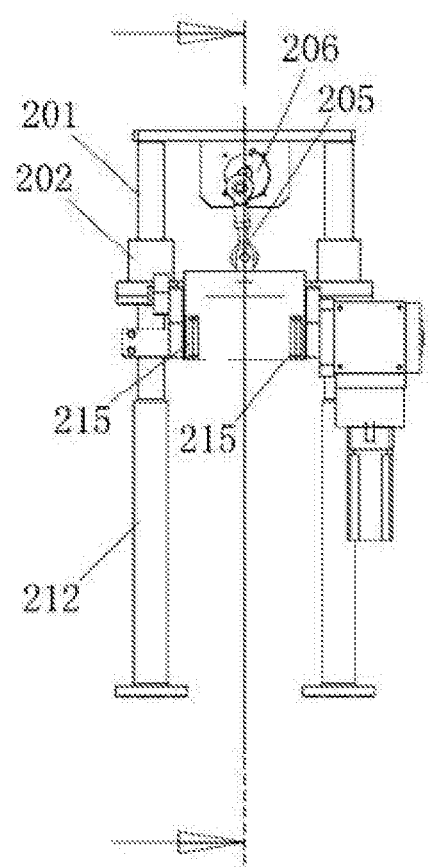
FIG. 14 is a side view of the sending and cutting part.
Figure 15:
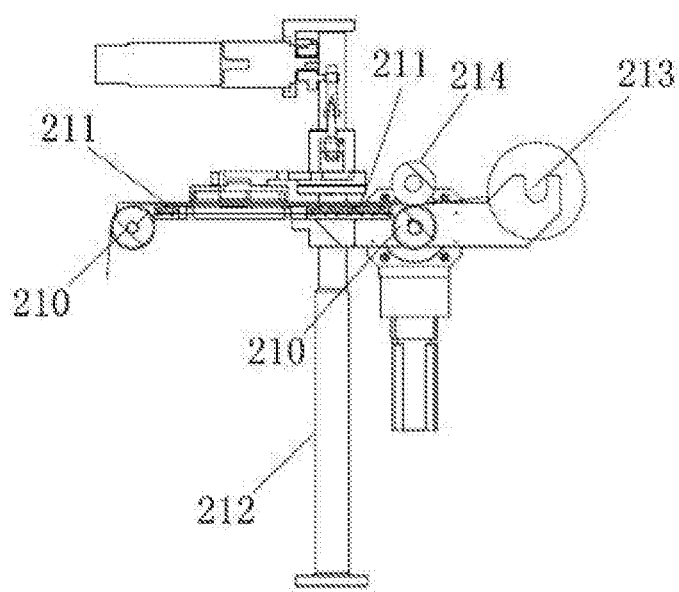
FIG. 15 is a section view of the sending and cutting part.
Figure 16:
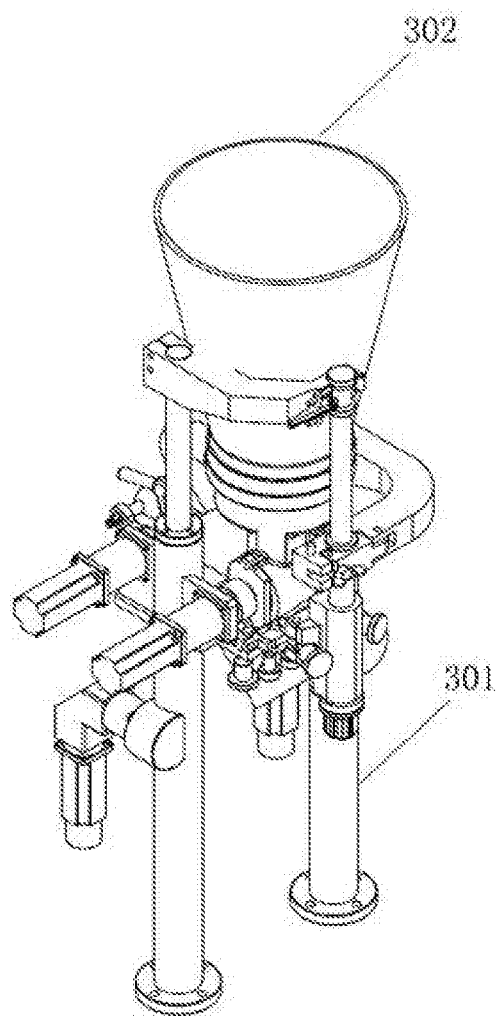
FIG. 16 is a perspective view of a filling part.
Figure 17:
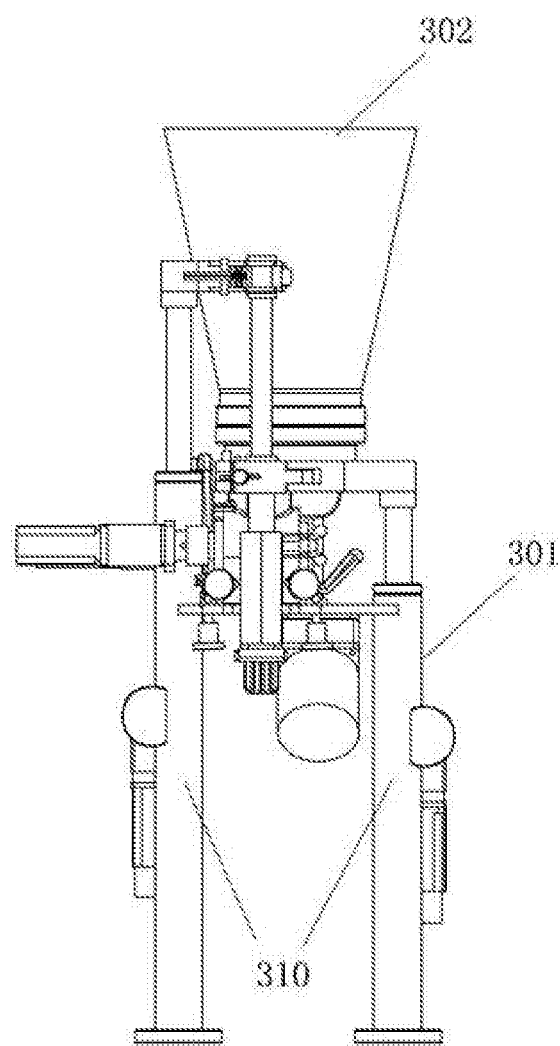
FIG. 17 is a frontal view of the filling part.
Figure 18:
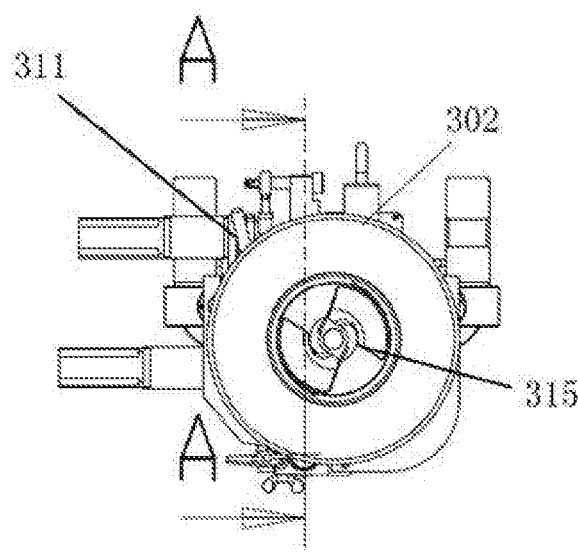
FIG. 18 is a top view of the filling part.
Figure 19:
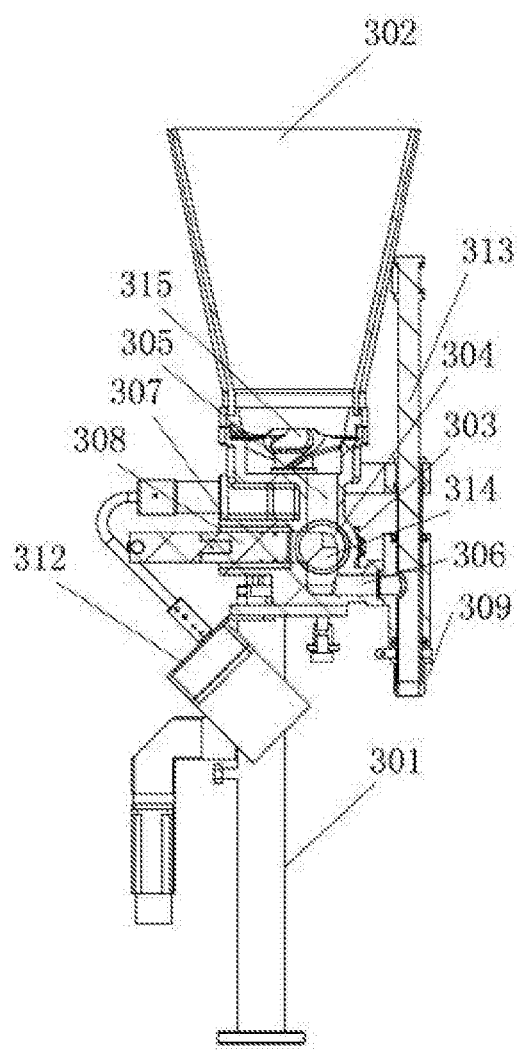
FIG. 19 is a section view of the filling part.
Figure 20:
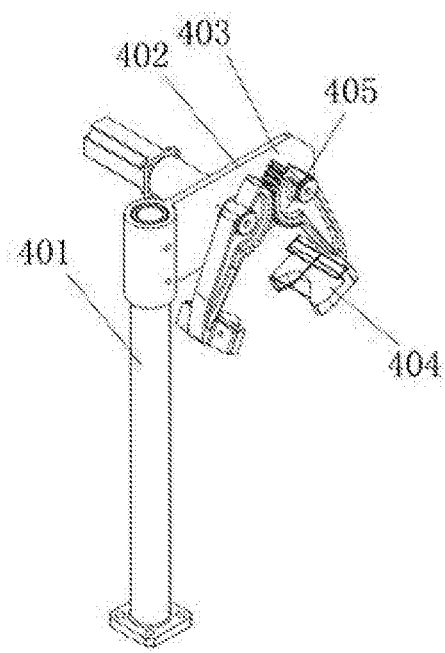
FIG. 20 is a perspective view of a pressing and shaping part.
Figure 21:
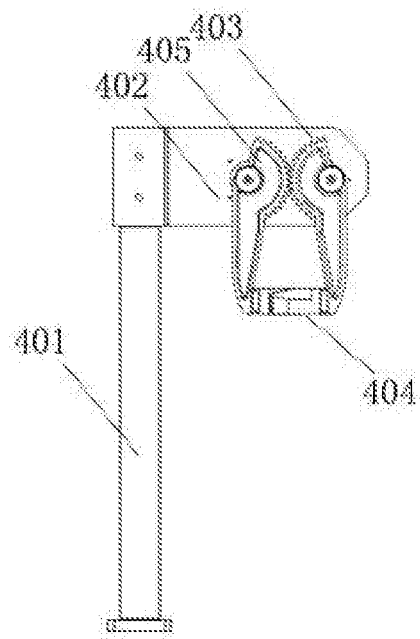
FIG. 21 is a front view of the pressing and shaping part. Element number: sending and cutting station 20, filling station 30, pressing and shaping station 40, dumpling taking-out station 50, rotation assembly 100, sending and cutting part 200, filling part 300, pressing and shaping part 400, taking-out part 500, framework 600.

rotation disc 101, base 102, guiding plate 103, first guiding rail 104, second guiding rail 105, opening 106, rotation sleeve 107, worm wheel 108, worm screw 109, shaping molding 1001, first roller 1002, second roller 1003, catch plate 1004, molding cup 1005;

guiding pillar 201, cylinder sleeve 202, cutter holding plate 203, cutter 204, connecting rod 205, eccentric wheel 206, cutting plate 207, hole cutter 208, dough sheet supporter 209, dough sheet sending roller conveyor 210, minor roller conveyor 211, supporting pillar 212, groove 213, driven roller conveyor 214, drive belt 215;

supporting frame 301, hopper 302, rotating base 303, rotating valve 304, filling tube 305, outlet pipe 306, transverse injecting tube 307, transverse injecting rod 308, longitude injecting tube 309, gear rack driving mechanism 310, eccentric wheel driving mechanism 311, worm driving mechanism 312, longitude injecting rod 313, L-shaped tunnel 314, screw conveyor 315;

supporting pillar 401, pressing mold 402, gear 403, pressing block 404, rotating plate 405.

DETAILED DESCRIPTION OF THE PREFERRED EMBODIMENT

Embodiment 1

Stuffed food forming machine comprises a framework 600 and a rotation assembly 100 on the framework; wherein a sending and cutting station 20 and a filling station 30 are on the rotation assembly 100; the rotation assembly 100 has an opening 106 for collecting wrapper residues from the sending and cutting station 20; a distance between an internal side of one of shaping molds 1001 and a center of the rotation assembly 100 is bigger than a distance between an edge of the opening 106 and the center of the rotation assembly 100; wherein the foods processed in the present invention include all kinds of stuffed foods such as dumplings, Tangyuan, Baozi, Shumai, Custard bun, Wonton, etc. Take the process of making dumpling as an example, the dough sheet before cutting is dumpling dough sheet, the dumpling dough sheet is cut into wrappers; the residues left is wrapper residues. The distance between an internal side of one of shaping molds 1001 and a center of the rotation assembly 100 is bigger than a distance between an edge of the opening 106 and the center of the rotation assembly 100 and the residues are able to conveniently drop in the opening 106.

The sending and cutting part 200 is set on the sending and cutting station 20. The filling part 300 is set on the filling station 30. The sending and cutting part 200 and filling part 300 adopts conventional mechanism. The sending and cutting station 20 and filling station are settled on the rotation assembly 100 while other work stations are able to be set inside the rotation disc or other positions.

The Working Principle:

step 1: sending and cutting the dough sheet; wherein the shaping mold 1001 on the rotation disc is under the sending and cutting station 20; the dough sheet is cut into pre-set shape before dropping in the shaping mold 1001; the residues are collected by the opening 106 on the rotation disc 101 and transported downward.

step 2: filling the dumpling with stuffing; wherein the shaping mold 1001 transports the wrapper to the filling station 30; the stuffing is injected in the wrapper Embodiment 2

Stuffed food forming machine comprises a framework 600 and a rotation assembly 100 on the framework; wherein a sending and cutting station 20 and a filling station 30 are on the rotation assembly 100; the rotation assembly 100 has an opening 106 for collecting wrapper residues from the sending and cutting station 20; the distance between the internal side of one of shaping molds 1001 and the center of the rotation assembly 100 is bigger than a distance between an edge of the opening 106 and the center of the rotation assembly 100; wherein the foods processed in the present invention include all kinds of stuffed foods such as dumplings, Tangyuan, Baozi, Shumai, Custard bun, Wonton, etc. Take the process of making dumpling as an example, the dough sheet before cutting is dumpling dough sheet, the dumpling dough sheet is cut into wrappers; the residues left is wrapper residues. The distance between an internal side of one of shaping molds 1001 and a center of the rotation assembly 100 is bigger than a distance between an edge of the opening 106 and the center of the rotation assembly 100 and the residues are able to conveniently drop in the opening 106.

The sending and cutting part 200 is set on the sending and cutting station 20. The filling part 300 is set on the filling station 30. The sending and cutting part 200 and filling part 300 adopts conventional mechanism. The sending and cutting station 20 and filling station are settled on the rotation assembly 100 while other work stations are able to be set inside the rotation disc or other positions.

A pressing and shaping station 40 and a dumpling taking-out station 50 are set beside the filling station 30 around the rotation assembly 100. A pressing and shaping part 400 is on the pressing and shaping station 40. A taking-out part 50 is on the dumpling taking-out station 500. The pressing and shaping part 400 and the taking-out part 500 adopts conventional structure.

The Working Principle:

step 1: sending and cutting the dough sheet; wherein the shaping mold 1001 on the rotation disc is under the sending and cutting station 20; the dough sheet is cut into pre-set shape before dropping in the shaping mold 1001; the residues are collected by the opening 106 on the rotation disc 101 and transported downward;

step 2: filling the dumpling with stuffing; wherein the shaping mold 1001 transports the wrapper to the filling station 30; the stuffing is injected in the wrapper;

furthermore step 3: pressing and shaping; wherein the shaping mold 1001 is transported to the pressing and shaping station 40 by the rotation disc 101; the wrapper is pressed and shaped; and step 4: taking out the dumpling; wherein the shaping mold 1001 is transported to the dumpling taking-out station 50; taking out the dumpling.

Embodiment 3

Stuffed food forming machine comprises a framework 600 and a rotation assembly 100 on the framework; wherein a sending and cutting station 20 and a filling station 30 are on the rotation assembly 100; the rotation assembly 100 has an opening 106 for collecting wrapper residues from the sending and cutting station 20; the distance between the internal side of one of shaping molds 1001 and the center of the rotation assembly 100 is bigger than a distance between an edge of the opening 106 and the center of the rotation assembly 100; wherein the foods processed in the present invention include all kinds of stuffed foods such as dumplings, Tangyuan, Baozi, Shumai, Custard bun, Wonton, etc. Take the process of making dumpling as an example, the dough sheet before cutting is dumpling dough sheet, the dumpling dough sheet is cut into wrappers; the residues left is wrapper residues. The distance between an internal side of one of shaping molds 1001 and a center of the rotation assembly 100 is bigger than a distance between an edge of the opening 106 and the center of the rotation assembly 100 and the residues are able to conveniently drop in the opening 106.

The sending and cutting part 200 is set on the sending and cutting station 20. The filling part 300 is set on the filling station 30. The sending and cutting part 200 and filling part 300 adopts conventional mechanism. The sending and cutting station 20 and filling station are settled on the rotation assembly 100 while other work stations are able to be set inside the rotation disc or other stations.

A pressing and shaping station 40 and a dumpling taking-out station 50 are set beside the filling station 30 around the rotation assembly 100. A pressing and shaping part 400 is on the pressing and shaping station 40. A taking-out part 50 is on the dumpling taking-out station 500. The pressing and shaping part 400 and the taking-out part 500 adopts conventional structure.

The working principle:

step 1: sending and cutting the dough sheet; wherein the shaping mold 1001 on the rotation disc is under the sending and cutting station 20; the dough sheet is cut into pre-set shape before dropping in the shaping mold 1001; the residues are collected by the opening 106 on the rotation disc 101 and transported downward;

step 2: filling the dumpling with stuffing; wherein the shaping mold 1001 transports the wrapper to the filling station 30; the stuffing is injected in the wrapper;

furthermore step 3: pressing and shaping; wherein the shaping mold 1001 is transported to the pressing and shaping station 40 by the rotation disc 101; the wrapper is pressed and shaped; and step 4: taking out the dumpling; wherein the shaping mold 1001 is transported to the dumpling taking-out station 50; taking out the dumpling.

The rotation assembly 100 comprises the rotation disc 101. Multiple shaping molds 1001 are evenly distributed along the rotation disc 101. The opening 106 for collecting the wrapper residues is on the rotation disc 101. The distance between an internal side of one of shaping molds 1001 and a center of the rotation disc 101 is bigger than the distance between an edge of the opening 106 and the center of the rotation assembly 100. The opening 106 is a through hole on the rotation disc 101. The wrapper residues are easily collected and drop in the opening 106 due to the distance between an internal side of one of the shaping molds 1001 and a center of the rotation disc 101 is bigger than the distance between an edge of the opening 106 and the center of the rotation assembly 100.

The opening 106 is an uninterrupted circle on the rotation disc 101 which guarantees a smooth collection of the wrapper residues while the rotation disc 101 is rotating.

The opening 106 is a circle which is set on the center of the rotation disc 101.

The opening 106 is also able to be a ring which is set on the center or center-outward position.

The opening 106 runs through the rotation disc 101.

The relative position of the shaping mold 1001 and the opening 106 is limited;
wherein the top surface of the shaping molds 1001 lies above the opening 106; the shaping molds 1001 is set on an outer ring of the opening 106.

The outlook of the rotation disc is in a rectangle, circle or irregular shape.

The rotation disc 101 connects to a rotation sleeve 107 on the bottom; the rotation sleeve 107 connects to a worm wheel 108; the worm wheel connects to a worm screw 109; the worm screw 109 connects to a motor.

The rails are settled as below.

A base 102 is set under the rotation disc 101; a guiding plate 103 between the base 102 and the rotation disc 101 is a cylinder on which a first guiding rail 104 runs; wherein the first guiding rail 104 matches a first roller 1002 on a catch plate 1004 of the shaping mold 1001 to move the catch plate up and down.

The guiding plate 103 is an uninterrupted cylinder.

Breaks are set on the guiding plate. The breaks are partly disconnected or disconnected. The guiding plate 103 is able to adjust the shaping mold 1001 up and down. The guiding plate is no longer needed when there is no need to adjust the height of a certain processing station.

The breaks are not less than one.

A second guiding rail 105 is set along the base 102. The second guiding rail 105 matches the second roller 1003 on the molding cup 1005 of the shaping mold 1001 to move the molding cup up and down.

The working principle of the rotation assembly 100 is as below.

The motor drives the rotation disc 101 to rotate the shaping mold 1001. The wrapper residues left after the dough sheet being cut are collected by the opening 106. The base 102 and the guiding plate 103 under the rotation disc 101 don't rotate with the rotation disc. The guiding rails are on the base 102 and the guiding plate 103, which match the guiding rollers on the shaping mold 1001 to drive the catch plate 1004 and the shaping mold 1001 moving up and down separately.

The working principles of the guiding rails are as below.

Specifically, the shaping mold 1001 is conventional. The shaping mold 1001 comprises a catch plate 1004 and a molding cup 1005 settled in the catch plate 1004. The connecting rod under the catch plate 1004 connects to the first roller 1002. The connecting rod under the molding cup 1005 connects to the second roller 1003. The shaping mold 1001 rotates with the rotating disc 101 while the guiding plate 103 and the base 102 remain still. The first roller 1002 moves along the first guiding rail 104, which drives the catch plate 1004 to move up and down. The second roller 1003 moves along the second rail 105, which drives the molding cup 1005 up and down. The shaping mold 1001 is able to moves up and down to different processing stations and different parts of the machine due to the settlement of the guiding rails.

The structure of the sending and cutting part 200 is as below.

The sending and cutting part 200 comprises a guiding pillar 201 and a cylinder sleeve 202 put on the guiding pillar 201. The cylinder sleeve 202 connects to a cutter holding plate 203 under which a cutter 204 is settled. The cutter holding plate 203 connects to an eccentric wheel 206 by a connecting rod 205. The motor drives the eccentric wheel 206. A cutting plate 207 is placed under the cutter 204, on which cutter-holes 208 are placed on the cutting plate 207. The cutter-holes 208 match and act with the cutter 204 to cut the dough sheet.

Two dough sheet supporters 209 are placed across the supporting pillars. Two dough sheet sending roller conveyors 201 are placed on the two dough sheet supporters 209. Multiple minor roller conveyors 211 are settled between the two dough sheet sending roller conveyors 201. The cutting plate 207 is placed between the multiple minor roller conveyors 211. The present invention does not require conveyor belt while the conventional machine still needs one.

A guiding pillar 201 is on a top of each of the two supporting pillars 212. The supporting pillars 212 are on two sides of the dough sheet supporters 209.

Two grooves 213 for placing a dough sheet roller conveyor are on one end of the two dough sheet supporters 209. The dough sheet is wound to rolls by the dough sheet roller conveyor which is placed in the two grooves.

A driven roller 214 conveyor is placed above the dough sheet sending roller conveyor 210.

The dough sheet sending roller conveyor 210 is driven by a motor.

The two dough sheet sending roller conveyors 210 are connected by a belt 215 and rolling synchronized.

The working principle of the sending and cutting dough sheet is as below.

The dough sheet is driven by the dough sheet sending roller conveyors 210 and moves toward the cutter 204. The motor drives the eccentric wheel 206 to rotate. The connecting rod 205 rotates with the eccentric wheel 206. The cutter holding plate 203 is connected to the cylinder sleeve 202 and the connecting rod 205 and moves up and down along the guiding pillar 201. The cutter 204 moves up and down with the cutter holding plate 203 and acts with the cutter-holes 208 to cut the dough sheet.

The structure of the filling part 300 is as below.

The filling part 300 comprises a hopper 302 and a rotating base 303. A rotating valve 304 is inside the rotating base 303. The hopper 302 is connected a top of the rotating base 303 through filling pipe 305. An outlet pipe 306 is connected to the bottom of the rotating base 303. A transverse injecting tube 307 is besides the rotating base 303. A transverse injecting rod 308 is inside the transverse injecting tube 307. A longitude injecting tube 309 is on the mouth of the outlet pipe 306. The longitude injecting tube 309 is driven by the gear rack driving mechanism 310 to move up and down. The transverse injecting rod 308 reciprocates horizontally under the force of the eccentric wheel driving mechanism 311. The screw conveyor 315 inside the hopper 302 rotates under the force of worm driving mechanism 312. The rotating valve 304 is driven by the motor.

A longitude injecting rod 313 is in the longitude injecting tube 309. The longitude injecting rod 313 moves up and down inside the longitude injecting tube 309. The longitude injecting rod 313 is driven by the gear rack driving mechanism 310. The longitude injecting rod 313 pushes the stuffing down from the mouth of the outlet pipe 306.

The gear rack driving mechanism 310, eccentric wheel driving mechanism 311 and the worm driving mechanism are driven by different motors separately.

The gear rack driving mechanism 310 is inside the supporting frame 301.

An L-shaped tunnel 314 is inside the rotating valve 304.

The working principle of the filling part 300 is as follow.

The motor drives the worm screw and worm wheel to rotate. The worm screw and worm wheel drive the screw conveyor 315 inside the hopper 302 to stir the stuffing. The stirred stuffing is conveyed to the rotating valve 304. The motor drives the rotating valve 304 to rotate by 90 degrees counter-clockwise after the rotating valve 304 is filled with the stuffing. The motor drives the eccentric wheel driving mechanism 311. The eccentric wheel driving mechanism 311 drives the transverse injecting rod 308 to push the stuffing to the mouth of the outlet pipe. The motor drives the gear rack driving mechanism 310. The longitude injecting rod 313 driven by the gear rack driving mechanism 310 moves up and down to push down the stuffing into the wrapper.

The structure of the pressing and shaping part 400 is as below.

The pressing and shaping part 400 comprises a supporting pillar 401 and a pair of pressing molds 402. Teeth are on top of each of the pressing molds 402 and pressing blocks 404 are on bottom of the pressing molds 402. The teeth on one of the pressing mold 402 engage with the teeth on the other pressing mold 402. The two pressing blocks 404 are opposite to each other. The motor is connected to at least one of the pressing molds 402 on the top.

The outline of the contact surface of the two pressing block 404 is a curve.

One of the pressing blocks 404 is convex and the other pressing block 404 is concave.

The teeth 403 are set on the two semicircle rotating plates 405 which are opposite to each other.

The working principle of the pressing and shaping part 400 is as below.

The motor drives one of the pressing molds 402 to rotate. The teeth on the top of the pressing mold 402 drive the other pressing mold 402 to rotate through the engaged teeth. The two pressing block 404 on the bottom press each other and seal the wrapper in a curved shape.

A method of shaping the stuffed food comprises following steps.

step 1: starting the sending motor; driving and conveying the dough sheet; starting the stirring motor; stirring the stuffing continuously;

step 2: sending the dough sheet with a wrapper's length by the dough sheet sending motor; starting the sucking-and-pushing motor; sucking the material;

step 3: starting the cutting motor; cutting the dough sheet and driving the rotating valve 304 to rotate 90 degrees counter-clockwise by the rotating valve motor;

step 4: starting the suck-and-pushing motor; pushing the stuffing; driving the rotation valve to rotate by 90 degrees counter-clockwise by the rotation valve motor;

step 5: restoring the rotating valve 304 to the original position; starting the outer cylinder motor and the inner cylinder motor; driving the outer cylinder and inner cylinder respectively to push the stuffing into the wrapper;

step 6: restoring the outer cylinder motor and the inner cylinder motor to the original position after the stuffing is pushed into the wrapper;

step 7: driving the rotation disc to rotate 90 degrees by the rotation disc motor;

step 8: starting the pressing motor; pressing the wrapper with the stuffing inside and releasing a shaped dumpling;

step 9: driving the rotation disc to rotate 90 degrees by the rotation disc motor;

step 10: starting the taking-out motor and sending a clamper to the dumpling;

starting the clamping motor and clamping the dumpling;

step 11: restoring the taking-out motor; releasing the clamper and dropping the shaped dumpling;

step 12: driving the rotation disc to rotate 90 degrees and completing a processing circle; and step 13: going to the step 1.

The sending motor drives the dough sheet sending roller conveyor 210 of the sending and cutting part 200.

The stirring motor drives the screw conveyor 315 inside the hopper 302 in the filling part 300 to rotate.

The sucking-and-pushing motor drives the transverse injecting rod 308 in the filling part to moves horizontally.

The cutting motor drives the cutter 204 in the sending and cutting part 200 to move up and down and cut the dough sheet.

The rotation valve motor drives the rotation valve 304 in the filling part 300 to rotates.

The rotation disc motor drives the rotation disc 101 in the rotation assembly to rotate.

The outer cylinder motor drives the longitude injecting tube 309 in the filling part to move up and down.

The inner cylinder motor drives the longitude injecting rod 313 in the filling part 300 to move up and down.

The pressing motor drives the pressing mold 402 of the pressing and shaping part 400 to press and release.

The taking-out motor drives the clamper of the taking-out part 500 to move.

The clamper motor drives the clamper in the taking out part 500 to clamp and release the dumplings.

The above mentioned motors are servo motor.

The opening 106 on the rotation assembly 100 collects the wrapper residues and takes full advantage of the space under the rotation assembly 100. A recycling bin is placed under the opening to collect the wrapper residues, or a processing mechanism is settled under the opening to process the wrapper residues for reuse. The recycling bin or the processing mechanism does not increase the size of the machine and requires no extra space. The size of present invention is compact and is able to be further reduced, which meets the needs of a family, canteen or small shop.

The present invention replaces the conventional complicated driving mechanism driven by a single motor with separate motors for different parts. The improvement simplifies the driving mechanism and further reduces the space occupied by the conventional driving mechanism. The size of the present invention is further reduced. The size of the wrapper residues collecting mechanism is able to be enlarged accordingly for better performances.

The opening 106 is able to be in any shape for the convenience of the wrapper residues collection. The distance between the internal side of one of the shaping molds and the center of the rotation disc 101 is bigger than the distance between the edge of the opening 106 and the center of the rotation disc 101. The shaping molds 1001 are distributed on the outside of the opening 106 or the shades of the shaping molds fall partly or wholly into the opening 106. The wrapper residues are able to conveniently fall into the opening without guiding.

The present invention adopts worm screw 109 and worm wheel 108 structure to drive the rotation sleeve 107 and the rotation disc 101. The separate driving structure replaces the complicated cam mechanism and solves the problem of redundant driving structures required by a single motor.

The guiding plate 103 acts with the base 102 to move the catch plate 1004 and molding cup 1005 to move up and down between different positions. Breaks are on the first guiding rail 104 and the second guiding rail 105. The guiding rails are applied when the corresponding work stations are adjusted. The guiding rails with breaks are simple in structure and reduce cost in material.

Compared to conventional machine, the sending and cutting part 200 of the present invention removes the inner-pushing device inside the cutter 204, the conveyor belt and the scraper. The eccentric wheel structure drives the cutter 204 to cut the dough sheet. The structure is simplified and the moves are steady. The space needed is further reduced.

The dough sheet sending roller conveyor 210 acts with minor roller conveyors 211 to send the dough sheet. The dough sheet moves forward without a conveyor belt. The driven roller conveyor 214 above the dough sheet sending roller conveyor 210 brings more frictions to guarantee a smooth move of the dough sheet and avoid the sliding.

Each part of the present invention is driven by a different driving mechanism and a motor. The present invention removes complicated linkage structure, simplifies the whole structure and reduces the size of the machine. The gear rack driving mechanism 310, the eccentric wheel driving mechanism 311 and the worm screw and worm wheel guarantee a stable transmission and action.

The pressing molds 402 adopt gears 403 on the top to pressing the wrapper from above. The present invention improves the conventional structures and prevents a squeeze on other part of the dumpling besides the edge of the wrapper due to the conventional horizontal pressing or pressing from below. The outlook of the dumpling is improved. The motor drives the pressing mold 402 to rotate directly.

What is claimed is:

1. A stuffed food forming machine, comprising: a rotation assembly (100) wherein a sending and cutting station (20) and a filling station (30) are around the rotation assembly (100); the rotation assembly (100) has an opening (106) for collecting wrapper residues from the sending and cutting station; a distance between an internal side of one of shaping molds (1001) and a center of the rotation assembly (100) is bigger than a distance between an edge of the opening (106) and the center of the rotation assembly (100);

wherein the rotation assembly (100) further comprises a rotation disc (101), multiple shaping molds (1001) which are evenly distributed around the rotation disc (101); the rotation disc (101) has the opening (106) for collecting the wrapper residues; wherein the distance between an internal side of one of the shaping molds (1001) and the center of the rotation disc (101) is bigger than the distance between the edge of the opening (106) and the center of the rotation assembly (100);

wherein a base (102) is under the rotation disc (101); a guiding plate (103) between the base (102) and the rotation disc (101) is in a cylinder shape on a surface of which runs a first guiding rail (104); on a surface of the base (102) runs a second guiding rail (105).

2. The machine, as recited in claim 1, wherein the guiding plate (103) is a cylinder.

3. The machine, as recited in claim 1, wherein at least one break is on the guiding plate (103); the break is partly or wholly disconnected.

4. A stuffed food forming machine, comprising: a rotation assembly (100) wherein a sending and cutting station (20) and a filling station (30) are around the rotation assembly (100); the rotation assembly (100) has an opening (106) for collecting wrapper residues from the sending and cutting station; a distance between an internal side of one of shaping molds (1001) and a center of the rotation assembly (100) is bigger than a distance between an edge of the opening (106) and the center of the rotation assembly (100);

wherein a sending and cutting part (200) is on the sending and cutting station (20); a filling part (300) is on the filling station (30);

wherein the rotation assembly (100) further comprises a rotation disc (101), multiple shaping molds (1001) which are evenly distributed around the rotation disc (101); the rotation disc (101) has the opening (106) for collecting the wrapper residues; wherein the distance between an internal side of one of the shaping molds (1001) and the center of the rotation disc (101) is bigger than the distance between the edge of the opening (106) and the center of the rotation assembly (100);

wherein the rotation disc (101) connects to a rotation sleeve (107) on a bottom; the rotation sleeve (107) connects to a worm wheel (108); the worm wheel connects to a worm screw (109); the worm screw (109) connects to a first motor;

wherein the sending and cutting part (200) comprises a guiding pillar (201) and a cylinder sleeve (202) which is put on the guiding pillar (201); the cylinder sleeve (202) connects to a cutter holding plate (203); a cutter (204) is under the cutter holding plate (203); the cutter holding plate (203) connects to an eccentric wheel (206) through a connecting rod (205); a second motor drives the eccentric wheel (206) directly; a cutting plate (207) is under the cutter (204); cutter-holes (208) is set accordingly between the cutting plate (207) and the cutter (204);

wherein the stuffed food forming machine further comprises two transverse dough sheet supporters (209), two dough sheet sending roller conveyors (210), multiple minor roller conveyors (211), wherein the dough sheet sending roller conveyors (210) are on the dough sheet supporters (209); the minor roller conveyors (211) are between the two dough sheet sending roller conveyors (210); the cutting plate (207) is between the minor roller conveyors (211); a supporting pillar (212) is on each of the two sides of the dough sheet supporters (209); a guiding pillar (201) is on a top of the supporting pillar (212); a driven roller conveyor (214) is on a top of the dough sheet sending roller conveyors (210) which is driven by a third motor directly; the two dough sheet sending roller conveyors (210) are connected by a drive belt (215).

5. The machine, as recited in claim 4, wherein the filling part (300) comprises a supporting frame (301), a hopper (302) and a rotating base (303); a rotating valve (304) is inside the rotation base (303); the hopper (302) connects to a top of the rotating base (303) through a filling pipe (305); a stuffing outlet pipe (306) is under the rotation base (303); a transverse injecting tube (307) is on a side of the rotation base (303); a transverse injecting rod (308) is inside the transverse injecting tube (307); a longitude injecting tube (309) is on a mouth of the stuffing outlet pipe (306); the longitude injecting tube (309) moves up and down repeatedly which is driven by a gear rack driving mechanism (310); the transverse injecting rod (308) moves horizontally which is driven by an eccentric wheel driving mechanism (311); a screw conveyor (315) which is driven by a worm driving mechanism (312) rotates inside the hopper (302); the rotating valve is driven by a fourth motor directly.

6. The machine, as recited in claim 5, wherein a longitude injecting rod (313) is inside the longitude injecting tube (309); the longitude injecting rod (313) driven by the gear rack driving mechanism (310) moves up and down inside the longitude injecting tube (309); the gear rack driving mechanism (310), eccentric wheel driving mechanism (311) and worm driving mechanism (312) are driven separately by different motors; the gear rack driving mechanism (310) is inside the supporting frame (301); a L-shaped tunnel (314) is inside the rotating valve (304).

7. The machine, as recited in claim 5, wherein around the rotation assembly (100), a pressing and shaping station (40) and a dumpling taking-out station (50) are beside the filling station (30); the pressing and shaping station (40) comprises a pressing and shaping part (400); a taking-out part (500) is on the dumpling taking-out station (50); and wherein the pressing and shaping part (400) further comprises a supporting pillar (401) and a pair of pressing molds (402) which are fixed on the supporting pillar (401); a gear (403) is on top of each of the pressing molds (402); a pressing block (404) is on a bottom of each of the pressing molds (402); teeth of the gear on each of the pressing molds (402) match with each other; the pressing blocks (404) are opposite to each other; a top of at least one of the pressing molds (402) is connected to a fifth motor; a fitting surface of the pressing block (404) is a curve, wherein one of the pressing block (404) is concaved while a corresponding pressing block (404) is convex; the gear (403) is on each of two rotating plates (405); curved surfaces of the two rotating plates (405) are opposite to each other.

* * * * *